United States Patent Office 2,766,263
Patented Oct. 9, 1956

2,766,263

NEW BIOLOGICALLY ACTIVE POLYCONDENSED TRIARYLMETHANE DERIVATIVES AND A PROCESS FOR THEIR PREPARATION

Ladislaus Arthur Hahn, Gösta Ekström and Ernst Frank, Malmo, Sweden, assignors to A B Ferrosan, Malmo, Sweden, a corporation of Sweden No Drawing. Application March 2, 1953,
Serial No. 339,892

Claims priority, application Sweden March 28, 1952

5 Claims. (Cl. 260—395)

In our Belgian Patent No. 506,965 we describe the preparation of certain triphenyl methane derivatives substituted with hydroxy groups, which are inhibitors of hyaluronidase and as such active against polyarthritis. The principle of the process lies in replacing one of the hydrogen atoms in the methylene bridge of various diphenyl methane derivatives by a phenyl residue which is substituted with one or more OH groups and besides possibly with other radicals, for instance COOH.

The continued research within this domain showed that one obtains triarylmethane derivatives with essentially increased biological activity if one proceeds from polycondensed diarylmethane derivatives. Such polycondensed diarylmethane derivatives are formed on condensation of aromatic hydroxy compounds of the formula

with formaldehyde in the molar proportion of 1:0.5 beside monomeric diarylmethane derivatives of the formula

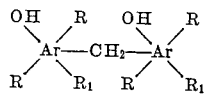

In these formulae:

Ar means a benzene or naphthalene nucleus,
R means H, OH, SO$_3$H, halogen, alkyl, alkoxy, acyloxy, acylamino, alkylamino, nitro and CN, and
R$_1$ means the same as R and besides COOH, sulfonamide and sulfone.

The proportion between the quantity of hydroxy compound and formaldehyde taking part in the reaction has a considerable influence on the proportion of the monomeric and polymeric diarylmethane derivatives in the reaction product. If the reaction is performed in the proportion of 1 mol hydroxy compound: at least 0.7 mol formaldehyde, polycondensed products are obtained almost exclusively, which products are partly high-molecular to such a degree that they do not dialyze through cellophane.

Of course, it is difficult to indicate an exact formula for such polycondensed diarylmethane derivatives. They can however be made clearer by the following general formula:

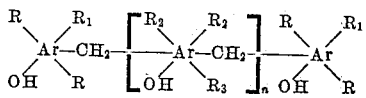

where:

Ar, R, and R$_1$ mean the same as has been indicated above, and
R$_2$ means the same as R, and
R$_3$ means the same as R$_1$, and where R$_2$ and R$_3$ can also mean a methylene group which is bonded to the group

where Ar, R$_2$ and R$_3$ mean the same as has been indicated above and R$_4$ means both H and a methylene group which is bonded to the group

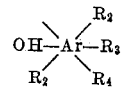

and where $n$ is an integer.

The present invention relates to new polycondensed triaryl methane derivatives which are substituted with one or more acid groups (COOH or SO$_3$H) in at least one of the three aromatic nuclei and which has been prepared from polycondensed diarylmethane derivatives. The products are biologically active as inhibitors of hyaluronidase and have given very good results against rheumatoid arthritis on clinical tests.

It was found that triarylmethane derivatives with an especially high inhibitor activity against hyaluronidase are obtained if at their preparation such polycondensed diarylmethane derivatives have been used as are obtained through condensation of aromatic hydroxy compounds with formaldehyde in the molar proportion of 1: at least 0.7.

As has been mentioned above, a hydrogen atom in the methylene bridges polycondensates of the diarylmethane type can be replaced by a phenyl or a naphthyl residue which can be substituted with one or more OH groups and/or possibly with other radicals, e. g. COOH, halogen, SO$_3$H, alkyl, alkoxy, acyloxy, alkylamino, acylamino, nitro, aryl, and CN. The process according to the invention consists in reacting a polycondensed diarylmethane derivative of the type described above in the presence of mineral acid and an oxidizing agent with an aromatic compound of the general formula

where R to R$_4$ mean the same as above.

In this connection it is without importance whether the polymeric diarylmethane derivative exists at this reaction as a finished, isolated substance or if the condensation to a polymeric triarylmethane derivative is undertaken through the influence of an aromatic compound of the formula

and an oxidizing agent on a polymeric diarylmethane derivative in statu nascendi.

In the latter case there are consequently added to the reaction mixture instead of the finished diarylmethane derivative on one hand an aromatic hydroxy compound of the formula

or a mixture of such compounds and on the other formaldehyde in excess. It should be observed in this connection however that only ⅔ of the molecules of the aromatic component take part in the formation of the chain

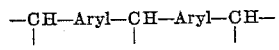

whereas ⅓ reacts with the oxidizing agent and the methylene bridges. The proportion of 1:0.7 for forming diarylmethane polycondensate corresponds to a proportion of 1.5:0.7 at the last-mentioned modification of the carrying out of the preparation.

In certain cases it has proved suitable to introduce certain substituents into the aromatic nuclei after the condensation of the diphenylmethane derivative to triphenylmethane derivative. Examples of the groups which can preferably be introduced in this way are COOH, SO₃H, and halogen. Other substituents in the final product can be obtained by already existing substituents being converted thereinto. Thus, for instance, the cyano group can be converted into a carboxyl group or a nitro group can be reduced to an amino group.

*Examples*

1. 1 kilogram of p-hydroxy-benzoic acid is boiled for 2 hours with a mixture of 1 kilogram of concentrated hydrochloric acid, 4 kilograms of water and 1.3 kilograms of a 40 percent formalin under agitation and with reflux. The reaction product forms a thickly flowing mass, from which the hydrochloric acid liquid is decanted. After cooling, the substance is pulverized and washed with hot water of 60° C. Yield: 870 grams of almost white substance with a relative inhibitor activity of approximately 5,500 units per gram. 20 grams of this product are mixed with 14 grams of resorcin and admixed under agitation to a previously prepared mixture of 18 grams of sodium nitrite and 125 millilitres of concentrated sulfuric acid. The reaction temperature should lie below 25° C. After the admixing, the reaction mixture is agitated for another hour, whereupon it is poured into a mixture of 0.2 kilogram of ice and 0.4 kilogram of water. After some hours, the reddish-brown precipitate is filtered off, washed, boiled and dried. Yield: approximately 30 grams.

2. To a mixture of 1.3 litres of concentrated sulfuric acid and 2.6 litres of water are added 1 kilogram of β-resorcylic acid and 0.5 kilogram of a 40 percent formalin. The whole mixture is boiled for 3 hours under reflux and agitation. The liquid is filtered hot and the precipitate is washed with water, until the filtrate is free from sulfuric acid. Drying in vacuum at 40 to 50° C. Yield: 0.9 kilogram of a brownish red substance with a relative inhibitor activity of approximately 6,000 units per gram. 200 grams of this product are mixed with 150 grams of gallic acid and are admixed under agitation with a previously made mixture of 150 grams of sodium nitrite and 0.7 kilogram of concentrated sulfuric acid. Temperature below 30° C. After the admixing, the reaction mixture is agitated for another hour, whereupon it is poured into a mixture of 3.5 kilograms of ice and 3 kilograms of water. After some hours, the dark precipitate is filtered off, washed, boiled and dried. Yield: approximately 250 grams.

3. 208 grams of gentisic acid are dissolved in 650 millilitres of concentrated sulfuric acid and cooled to 20° C. At a temperature of 20 to 25° C., 117 millilitres of a 40 percent formalin are added dropwise under agitation. When all formalin has been added, the agitation is continued for another hour. The mixture is precipitated with a mixture of 10 litres of water and 5 kilograms of ice. The precipitate is sucked off and washed clean from sulfuric acid. The condensation product thus obtained is treated with 10 litres of boiling hot water, which dissolves low-polymeric substances of small value, and is filtered hot. The insoluble residue is dried at room temperature. Yield: 255 grams. The substance, which is soluble at pH 7, gives an inhibitor factor of 28,000. 100 grams of this product are mixed with 50 grams of gentisic acid and are admixed under agitation with a previously prepared mixture of 50 grams of sodium nitrite and 0.3 kilogram of concentrated sulfuric acid. The temperature is not allowed to exceed +10° C. After the admixing, the reaction mixture is agitated for another hour, whereupon it is poured into a mixture of 1.5 grams of ice and 1.3 kilograms of water. After some hours, the green-black precipitate is filtered off, washed, boiled and dried. Yield: 110 to 125 grams.

4. Like Example 2 except that 140 grams of gentisic acid are used in lieu of gallic acid.

5. Like Example 2 except that 115 grams of phloroglucinol are used in lieu of gallic acid.

6. Like Example 3 except that 50 grams of β-resorcylic acid are used in lieu of gentisic acid.

7. Like Example 3 except that 110 grams of gallic acid are used in lieu of gentisic acid.

8. γ-Resorcylic acid is condensed with formaldehyde in analogy with Example 3. 40 grams of the obtained polycondensed diphenylmethane derivative are mixed with 30 grams of sodium nitrite and 30 grams of p-hydroxybenzoic acid. The mixture is added in small portions and under agitation to 300 millilitres of concentrated sulfuric acid at a temperature of not more than 30° C. The reaction mixture is agitated for another hour, whereupon it is poured into a mixture of 0.5 kilogram of ice and 0.7 kilogram of water. After some hours, the precipitate is filtered off, washed, boiled and dried. Yield: approximately 50 grams of a brown substance.

9. Analogous with Example 8 except that 35 grams of 3,4-dihydroxy-benzoic acid are used in lieu of p-hydroxybenzoic acid.

10. Analogous with Example 8 except that the diphenylmethane derivative is replaced by 42 grams of the polycondensate prepared in accordance with Example 2 from vanillic acid and formaldehyde, and p-hydroxybenzoic acid by 33 grams of vanillic acid.

11. Analogous with Example 8 except that the diphenylmethane derivative is replaced by 45 grams of the polycondensate prepared in accordance with Example 2 from phloroglucinol carboxylic acid and formaldehyde, and p-hydroxybenzoic acid by 33 grams of α-resorcylic acid.

12. 5 grams of the polymeric diphenylmethane derivative prepared in accordance with Example 1 from 4-methyl salicylic acid and formaldehyde, 2.5 grams of sodium nitrite, and 3 grams of phloroglucinol carboxylic acid are finely divided and mixed. Under cooling, 55 grams of concentrated sulfuric acid are carefully admixed (temperature not above 30°), and thereupon the reaction mixture is stirred until red nitrogen oxide gas appears. The homogeneous, dark mixture is poured under agitation into ice water. After some hours, the precipitate is filtered and washed with water. It can be cleaned through dissolving in a theoretical quantity of sodium hydroxide, filtering, and precipitation with hydrochloric acid. Yield: approximately 5 grams.

13. Analogous with Example 3 except that the polymeric diphenylmethane derivative is replaced by 120 grams of the polymeric product prepared in accordance with Example 1 from 2-hydroxy-1-naphthoic acid and formaldehyde, and the gentisic acid by 100 grams of β-naphthol.

14. Analogous with Example 12 except that the diphenylmethane derivative is replaced by 5 grams of the polymeric diphenylmethane derivative prepared in accordance with Example 2 from 4-cyano salicylic acid and formaldehyde, and the phloroglucinol carboxylic acid by 2.5 grams of β-resorcylic acid.

15. Analogous with Example 1 except that the diphenylmethane derivative is replaced by 20 grams of the mixed polymerisate prepared in accordance with Example 2 from β-resorcylic acid, phenol, and formaldehyde, and the resorcin by gentisic acid.

16. Analogous with Example 12 except that the diphenylmethane derivative is replaced by 5 grams of the polymeric product prepared in accordance with Example 1 from 4-hydroxyphthalic acid and formaldehyde, and the phloroglucinol carboxylic acid by 4 grams of phthalic acid.

17. Analogous with Example 8 except that the diphenylmethane derivative is replaced by 45 grams of the polymeric substance prepared in accordance with Example 1 from 2-hydroxy-4-acetoxybenzoic acid and formaldehyde, and the p-hydroxy-benzoic acid by 30 grams of β-resorcylic acid.

18. Analogous with Example 12 except that the diphenylmethane derivative is replaced by 7 grams of the polymeric product prepared in accordance with Example 3 from 2,5-dihydroxy-benzoic acid-4-sulfonic acid and formaldehyde, and the phloroglucinol carboxylic acid by 4 grams of gentisic acid. The reaction mixture is poured into ice water, and the sulfuric acid is precipitated with barium carbonate. The barium sulfate is sucked off, and the barium in excess is precipitated from the filtrate with ammonium carbonate which is added to alkaline reaction. After filtration, the filtrate is evaporated on a water bath and is dried at 80° C. The ammonium salt thus obtained amounts to 9 grams.

19. Analogous with Example 12 except that the diphenylmethane derivative is replaced by 6 grams of the polymeric substance prepared in accordance with Example 3 from 3-chloro-gentisic acid and formaldehyde, and the phloroglucinol carboxylic acid by 4.5 grams of 3-chlorogentisic acid.

20. 10 grams of the compound prepared in Example 11 are dissolved in 100 millilitres of chloroform. Under agitation and cooling, a solution of 5 grams of bromine in 50 millilitres of chloroform is added during half an hour. After evaporation of the solvent, the substance is cleaned by boiling with water.

21. 5 grams of the compound prepared in Example 1 is suspended in a mixture of 25 grams of sodium bicarbonate and 50 millilitres of water. The suspension is heated for 4 hours on a water bath while carbon dioxide simultaneously is led through. After cooling, the carboxylated product is precipitated by addition of dilute hydrochloric acid to Congo acidic reaction.

22. 11.0 grams of the condensation product obtained according to Example 1 and 26 grams of crystallized sodium sulphite are dissolved in 150 millilitres of water and boiled for two hours. The solution is filtered, and the filtrate is boiled after addition of 13 grams of oxalic acid until all sulfur dioxide has disappeared. Thereupon, the solution is evaporated successively, and the crystallized slightly soluble sodium oxalate is sucked off. When oxalate does not crystallize any longer, the solvent is evaporated to dryness. The residue is treated with 2×50 millilitres of alcohol in order to release free oxalic acid. The insoluble residue is dried at 80° C. Yield: 9 grams.

23. 20 grams of N-acetyl-4-hydroxy-anthranilic acid are shaken for 48 hours with a mixture of 60 millilitres of concentrated sulfuric acid, 120 millilitres of water, and 8 grams of a 40 percent formalin at 35 to 40° C. The reaction product is filtered off and washed free from sulfuric acid with water. Drying in vacuum. 10 grams of the dark condensation product are treated with 8 grams of sodium nitrite, 8 grams of p-hydroxybenzoic acid, and 150 millilitres of concentrated sulfuric acid according to the process in Example 1.

24. 18.5 grams of 2-dimethylamino-4-hydroxybenzoic acid are refluxed for 4 hours with a mixture of 100 millilitres of concentrated hydrochloric acid, 100 millilitres of water, and 8 grams of a 40 percent formalin. The reaction product is filtered off, washed free from hydrochloric acid with water and dried in vacuum. 10 grams of the condensation product are treated with 9 grams of sodium nitrite, 9 grams of 4-nitro-salicylic acid, and 150 millilitres of sulfuric acid according to the process in Example 1.

25. 300 grams of resorcin are dissolved in 2 litres of dilute hydrochloric acid (1:5). 200 grams of a 40 percent formalin are added at once and the mixing is done quickly. After 2 days the reddish precipitate is filtered off, washed with water and dried in vacuum. Yield: 310 grams. 20 grams of the condensation product are treated with 10 grams of sodium nitrite, 10 grams of gallic acid and 100 millilitres of concentrated sulfuric acid according to the process in Example 1.

26. The product obtained in Example 24 is dissolved in a small excess of sodium hydroxide and is hydrogenated with palladium and hydrogen. After filtration, the pH of the filtrate is adjusted to 4 to 4.5. Thereby the triphenylmethane compound is precipitated with a free amino group.

27. 5 grams of the triphenylmethane derivative obtained according to Example 14 are boiled with 100 millilitres of dilute sulfuric acid (1:1) for 48 hours. After dilution with water the dark precipitate is filtered, washed with water and dried in vacuum. Titration shows that the CN group has been saponified to the carboxyl group.

28. 50 grams of o-nitrophenol are dissolved in 200 millilitres of ethanol. Under vigorous agitation, a mixture of 120 millilitres dilute hydrochloric acid (1:3) and 30 millilitres of a 40 percent formalin is added at once. After agitation for 24 hours the precipitate is filtered off, washed and dried. Yield: approximately 50 grams of yellowish-brown substance. 20 grams of the condensation product are treated with 10 grams of sodium nitrite, 10 grams of β-resorcylic acid and 100 millilitres of sulfuric acid according to the process in Example 1.

29. 25 grams of methyl-(4-hydroxyphenyl)-sulfone are refluxed for two hours with a mixture of 125 millilitres of concentrated hydrochloric acid, 150 millilitres of water, and 13 grams of a 40 percent formalin. The reaction product is filtered off, washed free from hydrochloric acid with water and dried in vacuum. 10 grams of the condensation product are treated with 7 grams of sodium nitrite and 7 grams of o-phenol sulfonic acid and 80 millilitres of concentrated sulfuric acid according to the process in Example 12. Working as in Example 18.

30. 420 millilitres of concentrated sulfuric acid are mixed under cooling and agitation with 60 grams of sodium nitrite, then with 120 grams of salicylic acid and then dropwise with 43 grams of a 40 percent formalin. During the admixture of formalin the temperature should not exceed +5° C. Agitation is continued for another 15 minutes, whereupon the mixture is poured onto 600 grams of ice+3 litres of water. After agitation during the night, the precipitate is filtered, washed and dried. Yield: approximately 100 grams of brown substance.

31. In analogy with the process in Example 30, 120 grams of p-hydroxy-benzoic acid are condensed to a polymeric triphenylmethane derivative. Yield: 150 grams of salmon-coloured substance.

32. In analogy with the process in Example 30, 135 grams of β-resorcylic acid are condensed to a polymeric triphenylmethane derivative. Yield: 80 grams of black and brown substance.

33. In analogy with the process in Example 30, 135, grams of gentisic acid are condensed to a polymeric triphenylmethane derivative. Yield: 48 grams of dark-brown substance.

34. Like Example 30 but with 42 millilitres of concentrated sulfuric acid, 6 grams of sodium nitrite, 13.5 grams of γ-resorcylic acid and 4.3 grams of a 40 per cent formalin. Yield: 9 grams of reddish-brown triphenylmethane derivative.

35. Like Example 32 except that 17 grams of trihydroxy methylene are added in small portions in lieu of a 40 percent formalin.

36. Like Example 1 except that 15 grams of 4-phenylbenzoic acid are used in lieu of resorcin.

37. Like Example 12 except that 5 grams of the substance prepared in accordance with Example 3 from β-resorcylic acid and formaldehyde are used as polymeric diphenylmethane derivative and that the phloroglucinol carboxylic acid is replaced by 2.5 grams of 2-diethylamino-4-hydroxybenzoic acid.

38. Like Example 12 except that 5 grams of the substance prepared in accordance with Example 3 from gentisic acid and formaldehyde are used as polymeric diphenylmethane derivative and that the phloroglucinol carboxylic acid is replaced by 4 grams of 2-hydroxy-3-naphthoic acid.

39. Like Example 12 except that 5 grams of the substance prepared in accordance with Example 3 from gentisic acid and formaldehyde are used as polymeric diphenylmethane derivative and that the phloroglucinol carboxylic acid is replaced by 3 grams of 3,4-dihydroxy-5-acetoxy-benzoic acid.

40. Like Example 12 except that 5 grams of the substance prepared in accordance with Example 3 from gentisic acid and formaldehyde are used as polymeric diphenylmethane derivative and that the phloroglucinol carboxylic acid is replaced by 2.5 grams of 2,3,4,6-tetrahydroxy-benzoic acid.

41. Like Example 12 except that 5 grams of the substance prepared in accordance with Example 3 from gentisic acid and formaldehyde are used as polymeric diphenylmethane derivative and that the phloroglucinol carboxylic acid is replaced by 3 grams of N-acetyl-anthranilic acid.

42. Like Example 12 except that 5 grams of the substance prepared in accordance with Example 3 from gentisic acid and formaldehyde are used as polymeric diphenylmethane derivative and that the phloroglucinol carboxylic acid is replaced by 2.5 grams of 2-hydroxy-5-ethyl benzoic acid.

43. 20 grams of the polycondensed diphenylmethane derivative prepared in accordance with Example 2 from γ-resorcylic acid and formaldehyde are added in small portions and under agitation to a mixture of 10 grams of sodium nitrite and 100 millilitres of concentrated sulfuric acid. The temperature is not allowed to exceed +20° C. Working as in Example 1. The reaction product is much darker than the starting substance and shows considerably higher inhibitor activity.

44. Like Example 43 except that 20 grams of the polycondensed diphenylmethane derivative prepared in accordance with Example 2 from gentisic acid and formaldehyde are used in lieu of he polymeric methylene-di-γ-resorcylic acid.

45. Like Example 43 except that 20 grams of the polycondensed diphenylmethane derivative prepared in accordance with Example 2 from β-resorcylic acid and formaldehyde are used in lieu of the polymeric methylene-di-γ-resorcylic acid.

46. Like Example 43 except that 15 grams of the polycondensed diphenylmethane derivative prepared in accordance with Example 3 from 3-chloro-gentisic acid and formaldehyde are used in lieu of the polymeric methylene-di-γ-resorcylic acid.

47. Like Example 2 except that 150 grams of α-resorcylic acid are used in lieu of gallic acid.

48. Like Example 2 except that 200 grams of m-sulfobenzoic acid are used in lieu of gallic acid. Working as in Example 18.

49. Like Example 2 except that 145 grams of α-naphthol are used in lieu of gallic acid.

50. Like Example 2 except that 180 grams of 1-hydroxy-2-naphthoic acid are used in lieu of gallic acid.

51. Like Example 13 except that 70 grams of $N^4$-acetyl-sulfanilamide are used in lieu of gentisic acid.

52. In analogy with the process in Example 34, 15 grams of 3-chloro-4-hydroxybenzoic acid are condensed to a polymeric triphenylmethane derivative. Yield: 12 grams of black and brown substance.

53. In analogy with the process in Example 34, 16 grams of 2-di-methylamino-4-hydroxybenzoic acid are condensed to a polymeric triphenylmethane derivative. Yield: 10 grams of very dark substance.

54. 45 grams of 1-naphthol-4-sulfonic acid are dissolved in 150 millilitres of concentrated sulfuric acid. 20 millilitres of a 40 percent formalin are added dropwise at 20 to 25° C. under agitation. Thereupon, the agitation is continued for another 5 hours at 20° C. The mixture is poured into ice water and the sulfuric acid is precipitated with barium carbonate. The barium sulfate is sucked off and barium in excess is precipitated from the filtrate with ammonium carbonate, which is added to alkaline reaction. After filtration, the solution is evaporated on a water bath and dried at 80° C. The thus obtained ammonium salt of the polycondensed diphenylmethane derivative amounts to approximately 40 grams. 20 grams of the ammonium salt thus obtained are mixed with 15 grams of 1-naphthol-4-sulfonic acid, and the mixture is added in small portion and under agitation to a previously prepared solution in 125 millilitres of concentrated sulfuric acid of 15 grams of sodium nitrite. The temperature should be at 15° C. The agitation is continued for 1 hour at the same temperature, whereupon all of it is poured into 300 grams of ice+300 grams of water. The sulfuric acid is now precipitated with barium carbonate, the barium sulfate is filtered off, and barium in excess is precipitated from the filtrate with ammonium carbonate, which is added to alkaline reaction. After filtration, the solution is evaporated on a water bath to dryness. The yield is approximately 20 grams of ammonium salt of the polymeric triphenylmethane compound.

55. Analogous with Example 54 except that 1-naphthol-2-sulfonic acid is used in lieu of 1-naphthol-4-sulfonic acid.

56. Analogous with Example 54 except that 2-naphthol-8-sulfonic acid is used in lieu of 1-naphthol-4-sulfonic acid.

57. Analogous with Example 54 except that 35 grams of o-phenolsulfonic acid are used at the formaldehyde condensation and 20 grams of the obtained polymeric diphenylmethane derivative are condensed with 17 grams of β-resorcylic acid to a polycondensed triphenylmethane derivative.

58. 154 grams of gentisic acid are boiled for 5 hours with a mixture of 180 millilitres of concentrated sulfuric acid, 350 millilitres of water and 37.5 grams of a 40 percent formalin under agitation and reflux cooling. The liquid is decanted warm, the green polycondensation product is worked in a mortar and washed free from acid with water of 60° C. Drying at 40° C. in vacuum. 50 grams of the diphenylmethane derivative are mixed with 50 grams of gentisic acid and 50 grams of $NaNO_2$ and are added in small portions and under agitation to 250 millilitres of concentrated sulfuric acid. The reaction mixture temperature must lie between 0 and +5° C. The agitation is continued for another half an hour at the same temperature, whereupon the liquid is poured onto a mixture of 0.5 kilogram of ice and 2 kilograms of water. After some hours the dark precipitate is filtered off, washed, boiled out and dried. Yield: approximately 45 grams.

59. According to the process in Example 58, 50 grams of the diphenylmethane derivative described in Example 58, 50 grams of gallic acid and 50 grams of sodium nitrite are reacted with each other. Approximately 50 grams of triphenylmethane derivative are obtained.

60. 138 grams of p-hydroxy benzoic acid are boiled for 3 hours with a mixture of 140 grams of concentrated hydrochloric acid, 560 millilitres of water and 37.5 grams of a 40 percent formalin under agitation and reflux cooling. The liquid is decanted warm, the tough polycondensation product is worked in a mortar after cooling and washed free from acid with warm water. Drying at 40° C. in vacuum. 50 grams of the diphenylmethane derivative are reacted with 50 grams of p-hydroxy benzoic acid and 50 grams of sodium nitrite in accordance with the process in Example 58.

61. In accordance with the process in Example 58, 20 grams of methylene-di-(α-resorcylic acid), 10 grams of α-resorcylic acid and 10 grams of sodium nitrite are reacted with one another.

62. In accordance with the process in Example 58, 20 grams of methylene-di-(phloroglucinol carboxylic acid), 10 grams of gentisic acid and 10 grams of sodium nitrite are reacted with one another.

63. In accordance with the method in Example 58, 20 grams of methylene-di-(phloroglucinol carboxylic acid), 10 grams of m-sulfobenzoic acid and 10 grams of sodium nitrite are reacted with one another.

64. 170 grams of phloroglucinol carboxylic acid are mixed with 150 millilitres of concentrated hydrochloric acid, 400 millilitres of water and 37.5 grams of a 40 percent formalin. Under agitation and reflux cooling the whole is slowly heated to boiling which is continued for 1 hour. After cooling the precipitate is filtered, washed and dried in vacuum. 10 grams of this polycondensation product are reacted with 10 grams of N-acetylanthranilic acid and 10 grams of sodium nitrite, in accordance with the process in Example 58.

65. In accordance with the process in Example 58, 30 grams of the diphenylmethane derivative prepared in Example 64, 30 grams of o-nitro-phenol and 30 grams of sodium nitrite are reacted with one another.

66. The product obtained in Example 65 is dissolved in a small excess of caustic soda and hydrated with palladium and hydrogen. After filtration the pH of the filtrate is adjusted to 4 to 4.5. A triphenylmethane compound with a free amino group is precipitated.

What we claim and desire to secure by Letters Patent is:

1. A polycondensed triarylmethane derivative prepared by condensing a polycondensed diarylmethane compound, which is a product of the condensation of a compound of the formula

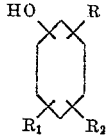

with formaldehyde in the molecular proportion 1: at least 0.7, with a compound of the formula

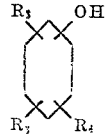

in the presence of an oxidizing agent and mineral acid, where, in the said formulae, R is a member selected from the group consisting of OH, alkoxy and acyloxy, $R_1$ is a member selected from the group consisting of $SO_3H$, and COOH, $R_2$ is a member selected from the group consisting of H, OH, acyloxy and alkoxy, $R_3$ is a member selected from the group consisting of H, OH, alkoxy, acyloxy, COOH, $SO_3H$, halogen, alkyl and nitro, and $R_4$ is a member selected from the group consisting of H and OH.

2. A polycondensed triarylmethane derivative prepared by condensing in the presence of gentisic acid, an oxidizing agent and mineral acid, a polycondensed methylene-di-gentisic acid, which is a product of the polycondensation of gentisic acid with formaldehyde in the molecular proportion of 1: at least 0.7.

3. A polycondensed triarylmethane derivative which has been prepared by condensing, in the presence of an oxidizing agent gentisic acid with formaldehyde in the molecular proportion of 1.5: at least 0.7.

4. A polycondensed triarylmethane derivative prepared by condensing in the presence of 3-sulpho-gentisic acid, an oxidizing agent and mineral acid, a polycondensed methylene-di-(3-sulpho-gentisic acid), which is a product of the polycondensation of 3-sulpho-gentisic acid with formaldehyde in the molecular proportion of 1: at least 0.7.

5. A polycondensed triarylmethane derivative prepared by condensing in the presence of γ-resorcylic acid, an oxidizing agent and mineral acid, a polycondensed methylene-di-(γ-resorcylic acid), which is a product of the polycondensation of γ-resorcylic acid with formaldehyde in the molecular proportion of 1: at least 0.7.

References Cited in the file of this patent
UNITED STATES PATENTS

| 1,707,181 | Weiler et al. | Mar. 26, 1929 |
| 1,906,890 | Weiler et al. | May 2, 1933 |